United States Patent [19]

Nippert

[11] 4,345,136
[45] Aug. 17, 1982

[54] COPPER BIMETAL BRAZED RESISTANCE WELDING ELECTRODE

[75] Inventor: Russell A. Nippert, Delaware, Ohio

[73] Assignee: The Nippert Company, Delaware, Ohio

[21] Appl. No.: 238,901

[22] Filed: Feb. 27, 1981

Related U.S. Application Data

[60] Division of Ser. No. 960,224, Nov. 13, 1978, Pat. No. 4,288,024, which is a continuation-in-part of Ser. No. 844,899, Oct. 25, 1977, abandoned, which is a division of Ser. No. 749,983, Dec. 13, 1976, Pat. No. 4,071,947.

[51] Int. Cl.³ .................................. B23K 11/30
[52] U.S. Cl. .................. 219/120; 219/85 R; 219/119
[58] Field of Search .................. 219/119, 120, 85 R

[56] References Cited

U.S. PATENT DOCUMENTS

| | | | |
|---|---|---|---|
| 2,138,388 | 11/1938 | Platz | 219/4 |
| 2,257,566 | 9/1941 | Lewis | 219/4 |
| 2,402,646 | 6/1946 | Leathers | 219/4 |
| 2,411,859 | 12/1946 | Harwood | 219/4 |
| 2,437,740 | 3/1948 | Haynes | 219/4 |
| 2,440,463 | 4/1948 | Cornwall | 219/4 |
| 2,446,932 | 8/1948 | Johnson | 219/4 |
| 2,472,173 | 6/1949 | Powell | 219/4 |
| 2,761,953 | 9/1956 | Kerr | 219/120 |
| 2,780,718 | 2/1957 | Mullen | 219/120 |
| 2,795,688 | 6/1957 | McCaffrey | 219/119 |
| 2,796,514 | 6/1957 | Wood | 219/120 |
| 2,829,239 | 4/1958 | Boretti | 219/120 |
| 2,986,273 | 5/1961 | Bardgett | 207/10 |
| 3,109,087 | 10/1963 | Larkworthy | 219/120 |
| 3,184,835 | 5/1965 | Coxe et al. | 29/182.5 |
| 3,197,843 | 8/1965 | Nippert | 29/155.5 |
| 3,197,857 | 8/1965 | Nippert | 29/480 |
| 3,634,934 | 1/1972 | Fitzgerald | 29/630 C |
| 3,779,714 | 12/1973 | Nadkarni et al. | 29/182.5 |
| 3,803,892 | 4/1974 | Yamaguchi et al. | 72/258 |
| 3,884,676 | 5/1975 | Nadkarni et al. | 75/0.5 BC |
| 3,893,844 | 7/1975 | Nadkarni et al. | 75/0.05 R |
| 3,909,581 | 9/1975 | Stone et al. | 219/120 |
| 3,969,156 | 6/1976 | Wallbaum | 148/11.5 R |
| 4,045,644 | 8/1977 | Shafer et al. | 219/119 |

FOREIGN PATENT DOCUMENTS

| | | |
|---|---|---|
| 661978 | 11/1951 | United Kingdom . |
| 941947 | 11/1963 | United Kingdom . |
| 1154323 | 6/1969 | United Kingdom . |
| 1177351 | 1/1970 | United Kingdom . |

OTHER PUBLICATIONS

"A New Dispersion-Strengthened Copper" by A. V. Nadkarni et al., *Metals Engineering Quarterly*, pp. 10–15, Aug. 19, 1976.

*Primary Examiner*—Elliot Goldberg
*Attorney, Agent, or Firm*—Biebel, French & Nauman

[57] ABSTRACT

A bi-metal resistance welding electrode has a dispersion strengthened copper tip and a high conductivity copper shank. The electrode is made by forming a tip member in two successive upsetting operations to produce a tip member having a coating of high conductivity copper covering substantially all of one end thereof. A solid, high conductivity copper, cylindrical billet is formed and brazed to the tip member at its coated end to form an extrusion blank. The extrusion blank is back extruded with the high conductivity copper material being worked substantially, while only partially back extruding the tip portion of the extrusion blank.

4 Claims, 9 Drawing Figures

U.S. Patent  Aug. 17, 1982  4,345,136
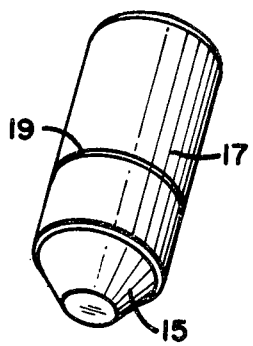
FIG-1
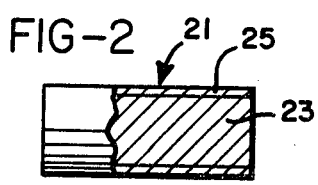
FIG-2
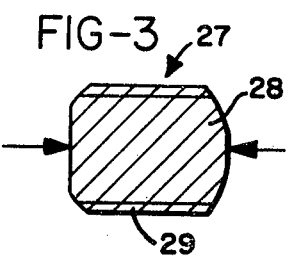
FIG-3
FIG-5
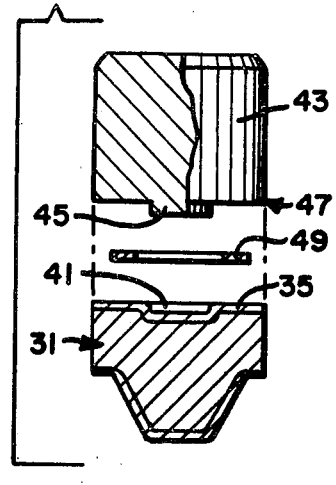
FIG-4
FIG-6
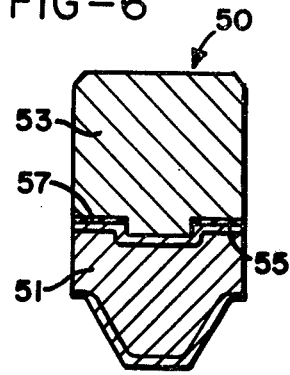
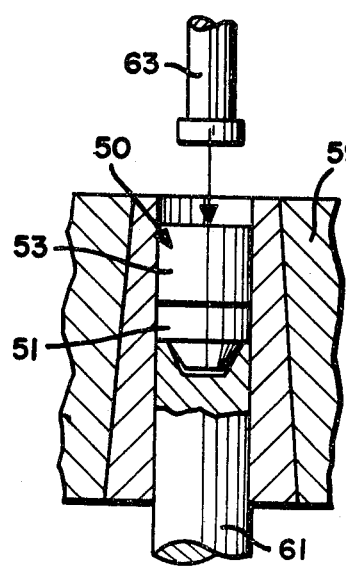
FIG-7
FIG-8
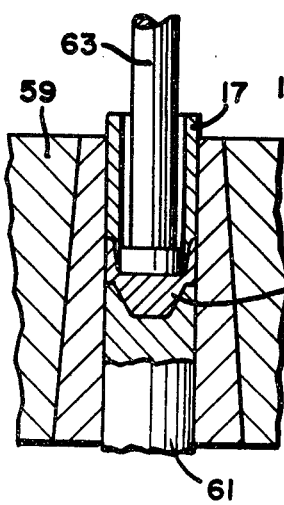
FIG-9
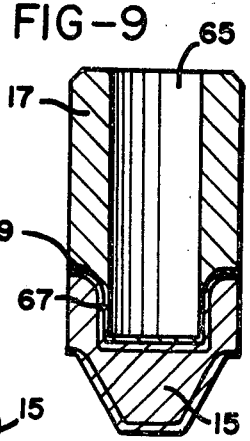

COPPER BIMETAL BRAZED RESISTANCE WELDING ELECTRODE

REFERENCE TO RELATED APPLICATIONS

This application is a division of application Ser. No. 960,224 filed Nov. 13, 1978 now U.S. Pat. No. 4,288,024 issued Sept. 8, 1981 which is a continuation-in-part of U.S. patent application Ser. No. 844,899, filed Oct. 25, 1977, abandoned which, in turn, is a divisional application of U.S. patent application Ser. No. 749,983, filed Dec. 13, 1976, now U.S. Pat. No. 4,071,947, issued Feb. 7, 1978.

BACKGROUND OF THE INVENTION

The present invention relates to resistance welding and, more particularly, to an improved electrode for use in a resistance welding device.

Resistance welding has long been used as a quick and effective method of joining metal members. The workpieces to be welded are placed in an abutting relationship and a large current is caused to flow across the boundary between the members my a pair of opposed electrodes. The current causes the surfaces of the workpieces to be heated sufficiently to cause the formation of a weld nugget. Typically, the electrodes apply significant pressure to the workpiece during welding. This facilitates the welding process by urging the material together and, also, reducing electrical resistance between the electrode tip and the workpiece material.

Since the welding is accomplished by resistance heating of the material being welded, it will be appreciated that the electrodes will also be heated substantially. It is important to have an electrode of high electrical conductivity in order to minimize the power loss in the electrode and the resulting heating of the electrode. It is also important to have an electrode which is capable of withstanding significant distorting force at the elevated temperatures which result from the welding process. Hollow electrodes have long been used for resistance welding with cooling fluid supplied to the interior cavity in order to reduce substantially the temperature of the electrode shank. It will be appreciated, however, that this method of cooling has certain limitations and, further, that the electrode tip cannot be cooled effectively in this manner.

Electrodes have, in the past, been formed of high conductivity copper in order to minimize the power loss in the electrodes. Such electrode material has a relatively limited life, however, which is due in large part to deformation of the electrode tip after repeated welding operations at high temperature and pressure. It has been the usual practice to reshape or redress the electrode tips to the desired shape. This can be accomplished only a limited number of times, however, and eventually the electrode must be discarded. Not only is it expensive to discard such electrodes, but the down time of the welding machine for the replacement of redressed electrodes may be even more expensive.

In order to minimize the cost of scrapping copper electrodes, two piece electrodes having a replaceable electrode tip and a reusable shank have been used. U.S. Pat. No. 2,440,463, issued Apr. 27, 1948, to Cornwall, U.S. Pat. No. 2,780,718, issued Feb. 5, 1957, to Mullen, U.S. Pat. No. 2,829,239, issued Apr. 1, 1958, to Boretti, and U.S. Pat. No. 2,402,646, issued June 25, 1946, to Leathers, all show replaceable electrode tips which are frictionally engaged by a shank portion of the electrode. U.S. Pat. No. 2,437,740, issued Mar. 16, 1948, to Haynes, and U.S. Pat. No. 2,472,173, issued June 7, 1949, to Powell, show mechanical brackets or set screw arrangements for holding the replaceable welding electrode tip.

Such a replaceable tip may also be attached to the shank portion by threading engagement as shown in U.S. Pat. No. 2,761,973, issued Sept. 4, 1956, to Kerr, U.S. Pat. No. 2,796,514, issued June 18, 1957, to Wood, and U.S. Pat. No. 3,310,087, issued Oct. 29, 1963, to Larkworthy. Both U.S. Pat. No. 2,257,566, issued Sept. 30, 1941, to Lewis and U.S. Pat. No. 2,411,859, issued Dec. 3, 1946, to Harwood, show welding electrode tips or tip portions which are mechanically interlocked with a shank portion. In the Harwood device, a reinforcing cap of hardened metal surrounds but does not cover the electrode tip. In the electrode of Lewis, a replaceable tip is pressed into interlocking engagement with the shank portion.

In U.S. Pat. No. 3,446,932, issued Aug. 10, 1948, to Johnson, a replaceable tip for a spot welding electrode is disclosed which is formed from a hardened material, e.g., a drawn copper slug. The tip is then bonded to the electrode body by fusible material, such solder, which has a fusion point lower than the annealing temperature of the tip. U.S. Pat. No. 2,138,388, issued Nov. 29, 1938, to Platz, discloses a replaceable electrode tip which is welded to the shank. U.S. Pat. No. 2,795,688, issued June 11, 1957, to McCaffrey, discloses a welding electrode having a stainless steel alloy tip which is brazed onto a shank made of copper.

U.S. Pat. No. 3,909,581, issued Sept. 30, 1975, to Stone et al, discloses a composite resistance welding electrode having a holder made of an inexpensive, relatively soft metal with high electrical and thermal conductivity and a tip which has additional strength at resistance welding temperatures. The tip may be formed of a more costly material, such as various copper alloys. The tip may be connected to the shank portion with a pressure fit or, alternatively, by brazing. A pressure fit will generally be unacceptable due to the high electrical resistance at the joint. If the tip is brazed onto the shank, however, the shank may be somewhat annealed and weakened. Thus, the improved number of welding operations which could be expected from such an electrode are reduced.

One material which has recently been developed and which has shown high promise for use in resistance welding electrodes is a dispersion strengthened copper which is formed by internal oxidation of a dilute copper-aluminum alloy. This material is extremely hard at welding temperatures and highly conductive. U.S. Pat. No. 3,779,714, issued Dec. 18, 1973, to Nadkarni et al, U.S. Pat. No. 3,884,676, issued May 20, 1975, to Nadkarni et al, and U.S. Pat. No. 3,893,841, issued July 8, 1975, to Nadkarni et al, disclose dispersion strengthened metals of the type intended to be used with the present invention. As discussed in the Aug. 1976 edition of METALS ENGINEERING QUARTERLY, pages 10–15, in an article by Nadkarni et al, this dispersion strengthened copper alloy material produces superior welding electrodes.

U.S. Pat. No. 4,045,644, issued Aug. 30, 1977, to Shafer et al discloses a welding electrode which is formed completely of a dispersion strengthened copper material. The electrode is produced by pressure flowing a blank transversely of an axially applied pressure. One problem with producing such an electrode in this manner, however, is that a relatively long, slender electrode cannot be formed, since the grain structure which would result produces an electrode of less than maximum strength. Another disadvantage of such a solid, dispersion strengthened copper electrode is the relatively high cost; this dispersion strengthened copper alloy material is more than twice as expensive as a conventional chrome copper alloy.

U.S. Pat. No. 3,969,156, issued July 13, 1976, to Wallbaum, discloses a method of making a welding electrode having a portion of the electrode formed of a dispersion strengthened copper material. In the Wallbaum method, discs of dispersion strengthened copper are interspersed in a stack with discs of high conductivity copper. The stack of discs is then extruded to form the resistance welding electrode. Following the extrusion process, an extra step is required in which the electrode is heat-treated for precipitation hardening of the high conductivity copper portion of the electrode.

In U.S. Pat. No. 3,184,835, issued May 25, 1965, to Coxe et al, a bi-metal welding electrode is disclosed having an internally oxidation hardened alloy tip. The tip is brazed to a shank after the tip and shank are formed. The disadvantage in such a process, as discussed with respect to the Stone et al patent above, is that the shank portion of the electrode may become annealed during the brazing operation, resulting in a relatively weak electrode structure.

Accordingly, it is seen that there is a need for a bimetal electrode having a dispersion strengthened copper tip and a shank portion formed of a less expensive, high conductivity copper which sufficiently hard to withstand the stress of a resistance welding operation.

SUMMARY OF THE INVENTION

A bimetal resistance welding electrode has a dispersion strengthened copper tip portion, formed of a copper-aluminum alloy which is internally oxidized and cold worked. The tip portion has a coating of high conductivity copper on the upper surface thereof. A full-hard extruded shank portion of high conductivity copper is attached to the upper surface of the tip portion by a brazing operation which is carried out prior to extrusion of the shank portion.

The bimetal resistance welding electrode is formed by cutting a cylindrical rod of the desired quantity of dispersion strengthened material for the electrode tip. The rod includes a coating of high conductivity copper which extends circumferentially therearound. The cylindrical rod is upset along the axis thereof to form a generally cylindrical billet having a coating of high conductivity copper extending circumferentially therearound. The cylindrical billet is then upset in a direction perpendicular to the axis thereof to form an electrode tip member of extrusion diameter a coating of high conductivity copper covering substantially all of one end of the tip member. A solid, high conductivity copper, cylindrical billet of extrusion diameter is formed. The electrode tip member and the high conductivity copper cylindrical billet are placed together, with brazing compound therebetween. The electrode tip member, the high conductivity copper cylindrical billet, and the brazing compound are then heated, brazing together the tip member and the high conductivity copper cylindrical billet into a single extrusion blank having a tip portion formed of dispersion strengthened copper and a shank portion formed of annealed high conductivity copper. The shank portion of the extrusion blank is thereafter back extruded to form a high conductivity shank which is work hardened, while only partially back extruding the tip portion of the extrusion blank. A full-hard bimetal electrode is formed.

Accordingly, it is an object of the present invention to provide a bimetal resistance welding electrode having a dispersion strengthened copper tip and a high conductivity copper shank, and a method of making such an electrode in which the tip portion and shank portion of the electrode are joined together by a brazed connection; to provide such an electrode and method in which the tip portion is formed in two successive upsetting operations to produce a tip member having a coating of high conductivity copper across the surface which is subsequently brazed to the shank portion of the electrode; and to provide such an electrode and method in which extrusion of the electrode occurs subsequent to brazing of the tip member to the material forming the shank portion of the electrode, such that a full-hard electrode is produced.

BRIEF DESCRIPTION OF THE DRAWINGS

FIG. 1 is a perspective view of a bimetal welding electrode embodying the present invention;

FIG. 2 shows a rod of dispersion strengthened copper material;

FIG. 3 shows the rod of FIG. 2, after it has been upset into a generally cylindrical billet;

FIG. 4 shows the electrode tip member formed by upsetting the billet of FIG. 3;

FIG. 5 is an exploded sectional view of the tip member, brazed compound, and a solid, high conductivity copper, cylindrical billet of extrusion diameter;

FIG. 6 illustrates the elements of FIG. 5, after being assembled and brazed together;

FIGS. 7 and 8 illustrate the back extrusion process by which the bi-metal resistance welding electrode of the present invention is formed; and FIG. 9 is an axial sectional view of the bi-metal resistance welding electrode of the present invention.

DETAILED DESCRIPTION OF THE PREFERRED EMBODIMENTS

The bi-metal resistance welding electrode of the present invention is illustrated in FIG. 1. This electrode includes a dispersion strengthened copper tip portion 15 which is formed of a copper-aluminum alloy which has been internally oxidized and cold worked. The electrode further includes a full-hard, hollow extruded shank portion 17 of high conductivity copper. The term high conductivity copper, as used herein, encompasses any of a number of copper compositions, such as pure copper and chromium-copper alloys, which are relatively inexpensive and provide sufficient strength when adequately cooled for the shank portion of a welding electrode. A brazed connection 19 between the shank portion 17 and the upper surface of the tip portion 15 joins these portions together. As described in greater detail below, the tip portion 15 has a coating of high conductivity copper (not shown in FIG. 1) adjacent the brazed connection 19.

Reference is now made to FIGS. 2–8 which illustrate the steps required for forming the bi-metal resistance welding electrode of the present invention. As shown in FIG. 2, initially a cylindrical rod 21 is cut, having the desired quantity of dispersion strengthened copper material for the electrode tip. The rod includes a core 23 of dispersion strengthened copper material and a cylindrical coating 25 of high conductivity copper, which extends circumferentially therearound. The copper alloy from which the rod 21 is formed may advantageously be of the type disclosed in U.S. Pat. No. 3,779,714, issued Dec. 18, 1973, to Nadkarni et al, and marketed by the Glidden-Durkee Division of SCM Corp., Baltimore, Md. 21226, as GLID COPPER. This alloy resists annealing at elevated temperatures and is an extremely good electrical conductor, as well as being very hard. These properties are accentuated by cold working the alloy.

Rod stock of GLID COPPER is typically formed, as shown in U.S. Pat. No. 4,045,644, issued Aug. 30, 1977, to Shafer et al, by packing powdered, dispersion strengthened copper alloy into a container of high conductivity copper and then extruding the containerized powder under pressure in a ram-type extrusion press. The result is a solid bar of metallurgically bonded, dispersion strengthened metal having a very thin clading or coating of high conductivity copper, the thickness of which is exaggerated in the drawings for clarity. For most applications of this dispersion strengthened copper alloy rod stock, the clading of high conductivity copper is superfluous. However, in the present invention this clading plays a significant role in the successful manufacture of the welding electrode, as described below.

The rod 21 is upset along the axis thereof to form a generally cylindrical billet 27, as illustrated in FIG. 3. Billet 27 has a core 28 of dispersion strengthened alloy and a coating 29 of high conductivity copper which extends circumferentially therearound. The upsetting process by which the billet 27 of FIG. 3 is formed has the effect of working the dispersion strengthened metal core 28 to produce an extremely hard billet. Preferably, the cold working should be sufficient to increase the cross-sectional area of the billet 27 by at least 50%.

The billet 27 is then upset in a direction perpendicular to the axis thereof to form an electrode tip member 31, as illustrated in FIG. 4. The electrode tip member 31 of dispersion strengthened copper material 33 has a coating 35 of high conductivity copper covering substantially all of one end 37. Additionally, high conductivity copper also coats the opposite end 39 of the tip member 31. The position of coating 35 on the tip member 31 results from the cross-forming operation in which billet 27 is upset in a direction perpendicular to the axis of the billet. The end 27 of the tip member 31 also defines a negative locator recess 41.

As shown in FIG. 5, a solid, high conductivity copper, cylindrical billet 43 of extrusion diameter is formed having a positive locator protrusion 45, centrally positioned on one end 47 thereof. Billet 43 is formed of the desired quantity of high conductivity copper for the shank portion of the finished electrode. The tip member 31 and the billet 43 are placed together with brazing material, such as silver braze ring 49, therebetween so that the protrusion 45 and the recess 41 mate. This assemblage of elements is then heated such that the tip member 31 and the high conductivity copper, cylindrical billet 43 are brazed together into a single extrusion blank 50, as illustrated in FIG. 6. The extrusion blank 50 has a tip portion 51 and a shank portion 53. The tip portion 51 is formed of dispersion strengthened copper alloy and the shank portion 53 consists of high conductivity copper which is substantially annealed throughout. The layer 55 of high conductivity copper adjacent the brazed connection 57 will also be substantially annealed.

In order to accomplish this brazing process, it is preferable to heat the elements to approximately 1600° F. in an atmosphere containing 4%, or less, hydrogen. If a higher percentage of hydrogen were to be present, hydrogen embrittlement of the dispersion strengthened copper alloy in the tip portion 51 would occur and reduction of the aluminum oxides within the metal might result. The dispersion strengthened copper in the tip portion 51 resists annealing up to approximately 1700° F. and, therefore, the tip portion of the extrusion blank 50 remains full hard.

Extrusion blank 50 is then back extruded to form the electrode, as illustrated in FIGS. 7 and 8. The extrusion blank 50, comprising shank portion 53 and tip portion 51, which have been previously brazed together, is placed in an extrusion die 59. The blank 50 is supported by knockout pin 61 during extrusion. An extrusion punch 63 is pressed into the die causing the shank portion 53 of the extrusion blank 50 to back extrude substantially, as illustrated in FIG. 8, while only partially back extruding the tip portion 51 of the extrusion blank. This substantial working of the shank portion 53 of extrusion blank 50 results in the high conductivity shank portion 17 of the electrode being completely work hardened, and at the same time forms the cavity 65 within the electrode.

As will be noted in FIG. 8, working of the tip portion 51 of the extrusion blank 50 is not substantial during the extrusion process. Since, however, the tip portion is not annealed during the brazing process by which the extrusion blank 50 is formed, working of the tip portion is not needed to reharden it. It is important, however, that the brazed connection 19 be adjacent the cavity 65 in the final electrode, as seen in FIG. 9, such that all of the high conductivity copper is efficiently cooled by the fluid in the cavity 65 during operation of the electrode. If all of the shank portion 17 of the electrode were not cooled, the shank would tend to anneal and therefore soften, thus shortening the effective life of the electrode.

It has been found that forming the tip members, illustrated in FIG. 4, by successive upsetting operations results in extrusion blanks which can be successfully back extruded into the final electrode shape with relatively little scrap loss due to fracture of the braze joint during extrusion. If this two-step upsetting process were not used and the rod 21, illustrated in FIG. 2, upset directly into a tip member having no high conductivity copper coating on its upper surface, the dispersion strengthened copper alloy contacting the brazed ring would tend to deplete the brazed joint of silver. If additional silver were added, the resulting brazed joint would not be sufficiently strong to withstand the substantial distortion of the brazed connection and the high flow of the conductive copper experienced during extrusion.

The layer 67 of high conductivity copper in the tip portion of the electrode, therefore, tends to prevent depletion of the sliver from the brazed connection. Additionally, the flow rate of this copper coating is substantially the same as the flow rate of the high conductivity copper in the shank portion of the extrusion blank 50. As a result, the stress experienced by the brazed connection 19 is reduced substantially, thus lessening the chance that this brazed connection will fracture during extrusion.

While the method and product herein described constitute preferred embodiments of the invention, it is to be understood that the invention is not limited to this precise method and product, and that changes may be made therein without departing from the scope of the invention.

What is claimed is:

1. A bimetal resistance welding electrode, comprising:
   a dispersion strengthened copper tip portion formed of a copper-aluminum alloy which is internally oxidized and cold worked and having a coating of high conductivity copper on the upper surface thereof,
   a full hard hollow, extruded shank portion of high conductivity copper, and
   a brazed connection between said shank portion and said upper surface of said tip portion.

2. A welding electrode for resistance welding which is capable of carrying high electrode currents, comprising:
   an extrusion hardened annular shank portion of high conductivity copper defining a central cavity into which cooling liquid may be supplied,
   a dispersion strengthened tip portion of a copper and aluminum oxide alloy, having a high conductivity copper coating on the upper surface thereof, and
   brazed connection means for connecting said tip portion at its upper surface to said shank portion, the part of said shank portion adjoining said brazed connection means being work hardened throughout.

3. The welding electrode of claim 2 in which the brazed connection means is adjacent said central cavity such that said brazed connection means and said shank portion are effectively cooled by cooling liquid in said cavity during resistance welding.

4. A welding electrode for resistance welding which is capable of carrying high current, comprising a substantially cylindrical electrode body defining a central cooling cavity and a fluid inlet opening at a first end of said electrode,
   said body including a shank portion extending from said first end part way along said electrode and formed of a full hardened high conductivity copper, and a tip portion formed of an internally oxidized cold worked copper-aluminum alloy, and extending from a second end of said body, opposite said first end, toward said shank portion and having a coating of high conductivity copper at the end of said tip portion opposite said second end of said body, said shank portion being connected to the high conductivity coating on said tip portion by a brazed connection surrounding said cavity, said brazed connection and said shank portion capable of being cooled by cooling liquid supplied to said cavity.

* * * * *